United States Patent
Young

(10) Patent No.: US 7,773,344 B1
(45) Date of Patent: Aug. 10, 2010

(54) SUSPENSION HAVING SEPARATELY OPTIMIZED TORSION STIFFNESS AND VERTICAL STIFFNESS

(75) Inventor: Kenneth F. Young, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 1129 days.

(21) Appl. No.: 11/429,876

(22) Filed: May 8, 2006

Related U.S. Application Data

(60) Provisional application No. 60/681,657, filed on May 16, 2005.

(51) Int. Cl.
G11B 21/16 (2006.01)
G11B 5/48 (2006.01)

(52) U.S. Cl. .................. 360/244.9; 360/244.5

(58) Field of Classification Search .............. 360/244.5, 360/244.9, 244.8, 245.7, 265.1, 264.1, 265.9, 360/266, 254.2
See application file for complete search history.

(56) References Cited

U.S. PATENT DOCUMENTS

| | | | |
|---|---|---|---|
| 5,796,554 A * | 8/1998 | Berding et al. ........... | 360/244.8 |
| 5,936,803 A * | 8/1999 | Berding .................... | 360/244.8 |
| 6,392,843 B1 * | 5/2002 | Murphy .................... | 360/245.3 |
| 6,504,684 B1 * | 1/2003 | Danielson et al. ........ | 360/244.8 |
| 6,714,386 B1 * | 3/2004 | Polycarpou et al. ...... | 360/265.1 |
| 6,771,469 B2 * | 8/2004 | Lindrose .................. | 360/244.2 |
| 6,778,362 B1 | 8/2004 | Davis et al. | |
| 7,333,299 B2 * | 2/2008 | Wada et al. .............. | 360/294.7 |
| 2003/0189790 A1 * | 10/2003 | Yim et al. ................... | 360/128 |

FOREIGN PATENT DOCUMENTS

JP 11066766 A * 3/1999

OTHER PUBLICATIONS

Machine translation of JP 11066766 A.*

\* cited by examiner

*Primary Examiner*—Julie Anne Watko
(74) *Attorney, Agent, or Firm*—Intellectual Property Law Offices of Joel Voelzke, APC

(57) ABSTRACT

A disk drive suspension has laterally separated mount plate cooperating structure of a pair of spaced, left and right hand continued extents defining engagement structures extending into the vertical plane of the suspension hinge portion, and laterally separated beam portion cooperating structure of left and right hand continuations defining cooperating engagement structures also extending into the vertical plane of the hinge portion and overlapping the mount plate extents to block their relative vertical movement in one direction but not the other so that rotation of the beam portion relative to the mount plate is limited by this selective engagement of the cooperating structures, while the hinge portion is untrammeled by the cooperating structures and the suspension has increased torsional stiffness without an increase in suspension vertical stiffness or has a decrease in suspension vertical stiffness without a decrease in torsional stiffness.

23 Claims, 4 Drawing Sheets

US 7,773,344 B1

SUSPENSION HAVING SEPARATELY OPTIMIZED TORSION STIFFNESS AND VERTICAL STIFFNESS

CROSS-REFERENCE TO RELATED APPLICATION

This application claims the benefit of U.S. Provisional Application Ser. No. 60/681,657, filed May 16, 2005.

BACKGROUND OF THE INVENTION

1. Field of the Invention

This invention relates to disk drive suspensions having increased torsional stiffness, and thus higher torsional frequency, without an increase in vertical stiffness, or that maintain a desired torsional stiffness with a reduction in vertical stiffness. More particularly, the invention provides single side-opposed and selectively engaged cooperating structures on the suspension mount plate and the suspension beam portion, in the vertical plane of the hinge portion, to limit relative beam portion rotation and thus increase torsional stiffness, by blocking passing movement of the structure members while allowing freedom of vertical movement away from each other.

2. Description of the Related Art

In the prior art it has been a given that the desirable increase in suspension torsional stiffness had as a necessary concomitant an undesirable increase in vertical stiffness. This association results from the practice of accomplishing vertical stiffness and torsional stiffness with similar techniques, such as making the mount plate and the load beam as rigid as possible, and making the spring of the hinge portion as wide and short as possible. The use of bracketing limiters to restrict vertical movement in both directions (closing and opening gaps between opposed structures rather than only closing as in the present invention) requires the close and synchronously interfittment of minute parts that adds to construction time and expense, and the wearing under friction of the interfitted parts generates erratic and spurious forces on the suspension and may generate damaging detritus.

BRIEF SUMMARY OF THE INVENTION

There is a demand for higher torsional stiffness and lower vertical stiffness simultaneously, that cannot be met unless the two types of stiffness are optimized separately. But before the present invention the available design choices to do this have been limited essentially to opening or removing the center portion of the spring.

In the present invention, there are added laterally spaced tabs in opposing relation on the suspension mount plate and beam portion; these add to the torsional stiffness but do not add to the vertical stiffness. This makes it possible to increase torsional stiffness and not increase vertical stiffness, or where torsional stiffness is adequate, to maintain the torsional stiffness and reduce the vertical stiffness. In general, the tabs are formed so that they reach across the spring or hinge area and make contact with their opposing tabs members precisely at the axis of rotation of the load beam as it is deflected. This has been analytically determined to exist in a fixed determinate location for each specific design. By placing the point of contact of the tabs from each side of the spring at this axis, no effect other than the desired increase in torsional stiffness and therefore torsional frequency is observed in modeling studies.

It is accordingly an object of the invention to provide an improved disk drive suspension. It is a further object to provide a disk drive suspension having separated or uncoupled torsion stiffness and vertical stiffness properties. A further object is to provide a suspension apparatus and method in which opposing cooperating structures carried by the mount plate and the beam portions selectively engage to increase torsional stiffness.

These and other objects of the invention to become apparent hereinafter are realized in a disk drive suspension comprising a generally horizontally extending mount plate, a base portion, a hinge portion and a beam portion, and a pair of laterally spaced cooperating engagement structures comprising vertically separable members on the mount plate and the beam portion respectively, the members being arranged in each pair to block their relative vertical movement in one direction but not in the other to increase torsional stiffness of the suspension freely of an increase in vertical stiffness or decrease vertical stiffness freely of a decrease in torsional stiffness.

In this and like embodiments, typically, the mount plate cooperating engagement structure comprises a pair of left and right hand laterally narrow continued extents of the mount plate distal region each having a first face and an oppositely facing second face, the beam portion cooperating structure comprising left and right hand laterally narrow continuations of the beam portion proximate region engagingly opposing one of the first and second faces of the beam portion distal region continued extents to block movement of the continuations past the engaged faces but not away from the engaged faces, the cooperating engagement structures are on either lateral side of the hinge portion and vertically untrammeled on one side for vertical movement in said other direction, the mount plate extends in a plane along the suspension longitudinal axis, the mount plate having a distal region defining the mount plate cooperating structure in vertically offset relation to the plane, the beam portion has a proximate region defining the beam portion cooperating structure, the beam portion has edge rails adjacent the beam portion cooperating structure, the mount plate extends in a plane along the suspension longitudinal axis, the mount plate having a distal region defining the mount plate cooperating structure in vertically offset relation to the plane and vertically opposed to the beam portion cooperating structure, the mount plate cooperating structure comprises a pair of left and right hand laterally narrow continued extents of the mount plate distal region extending into the vertical plane including the hinge portion, the beam portion cooperating structure comprising left and right hand narrow continuations of the beam portion proximate region extending into the vertical plane of the hinge portion and opposing the beam portion distal region continued extents on one side only, the left and right continued extents and the left and right continuations are maximally laterally spaced, and the left and right continued extents and the left and right continuations each have about the same lateral extent.

In a further embodiment, the invention provides a disk drive suspension comprising a generally horizontal mount plate, a base portion attached to the mount plate, a hinge portion extended from the base portion and a beam portion supported by said hinge portion, and a divided mount plate cooperating engagement structure comprising members defined by a pair of left and right hand laterally separated narrow continued extents of the mount plate extending into a vertical plane including the hinge portion, and laterally separated beam portion cooperating engagement structure comprising left and right hand laterally narrow continuations of said beam portion proximate region, and a divided beam portion cooperating engagement structure comprising members defined by a pair of left and right hand laterally separated, narrow continuations of the beam portion extending into the vertical plane and opposing respective mount plate members on one side thereof, whereby rotation of said beam portion is limited by selective engagement of the left hand or the right hand continued extents and continuations, while the hinge portion is untrammeled by the engagement of the continued extents and continuations, whereby the suspension has increased torsional stiffness without an increase in suspension vertical stiffness or has a decrease in suspension vertical stiffness without a decrease in torsional stiffness.

In this and like embodiments, typically, the left and right continued extents and the left and right continuations are maximally laterally spaced, the left and right continued extents and the left and right continuations each have about the same lateral extent, the cooperating engagement structures are on either lateral side of the hinge portion, the mount plate extends in a plane along the suspension longitudinal axis, the mount plate having a distal region defining the mount plate cooperating structure in vertically offset relation to the plane, the beam portion has a proximate region defining the beam portion cooperating structure, the beam portion has edge rails adjacent the beam portion cooperating structure, the mount plate extents in a plane along the suspension longitudinal axis, the mount plate continued extents being in a vertically offset relation to the plane and vertically opposed to the beam portion continuations, the hinge portion extends through a vertical plane between the mount plate and the beam portion, the continued extents and the continuations extending into a vertical plan in opposed relation, the left and right continued extents and the left and right continuations are maximally laterally spaced and each has about the same lateral extent.

In the invention method, there is provided a method of increasing or maintaining the torsional stiffness of a disk drive suspension comprising a mount plate, a base portion, a hinge portion and a beam portion freely of an increase in vertical stiffness, including opposing laterally separated cooperating engagement structures on the mount plate and the beam portion, and blocking movement of said structures past each other but not away from each other in response to rotational movement of said beam portion relative to said mount plate in suspension torsional stiffness increasing relation, and further engaging the structures at the axis of rotation of the beam portion.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
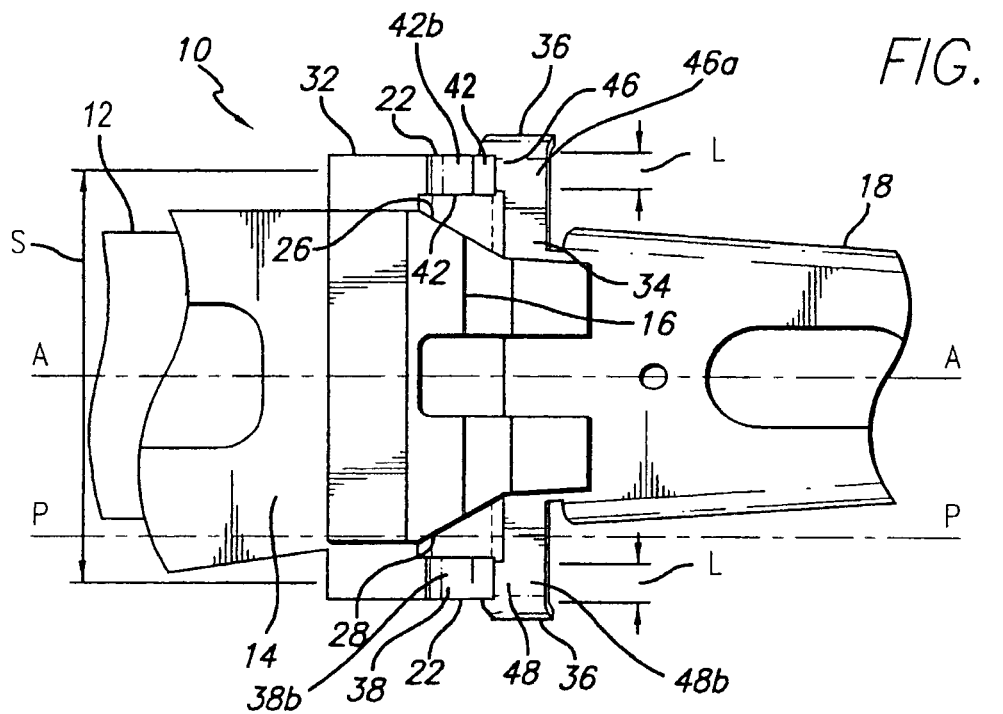
FIG. 1 is a bottom plan view of the spring area of the invented suspension, showing the cooperating structures.

Previously, the head gimbal assembly (HGA) mount plate/base and beam/stiffener were only connected by the relatively weak hinge/spring component; thus the portions of the masses of the mount plate and stiffener that contribute most to control of torsional motion were only weakly coupled together. This condition allowed substantial relative torsional motion between the mount plate and stiffener resulting in the stiffener torsional mode having a lower frequency.

The dynamic performance of the structure would be improved if it had greater stiffness, but an increase in hinge/spring stiffness is not desirable where optimum loading of the slider on the disk is needed. In accordance with the invention, greater torsional stiffness is achieved by augmenting the mechanical coupling between the base/mount plate and stiffener for the purpose of increasing torsional stiffness. This is accomplished with a negligible increase in the bending stiffness of the spring component which governs the force delivered by the structure that is referred to as "gram load", a force balanced by reacting to the air bearing force generated by the slider flying over the disk.

The torsion stiffness increase for a given spring stiffness is effected by a small change in the shape or geometry of the suspension at the unique location along the length of the load beam that behaves as an effective hinge as it is displaced from the free state to the loaded state (solid spring-hinge structure behaves as a hinge pivot) in practice. The unique location is at the outboard corners of the mount plate and load beam where cooperating structures are defined so as to meet and contact. In production terms this is a configuration change that makes the suspension dynamically stiffer with negligible effect upon static bending, hinge stiffness related behavior.

It has been determined that the frequency of the $1^{st}$ torsion mode can be increased by 50% or more by torsionally coupling the mount plate to the load beam as described herein. Also, it may be possible to modify the geometries of the mount plate, spring, and load beam so as to merge the torsion mode into the sway mode. This would yield an increased bandwidth having a frequency response with one less peak and enhance enhanced servo performance.

In a conventional suspension, torsional resonant frequency and torsional stiffness are closely related. The designer has to tolerate high vertical stiffness (undesirable) in order to get high torsional stiffness (desirable). The present breaks that connection and provides similar torsional stiffness and resonant frequency combined with lower vertical stiffness, or higher torsional stiffness and resonant frequency combined with equal vertical stiffness. This result is compromised where the relative movement of the cooperating structures is unduly limited as by bracketing one cooperating structure with the opposing structure to block movement of one past the other in both directions rather than merely blocking movement in one direction.

With reference now to the drawings in detail, in FIGS. 1 to 4 these and other objects of the invention to become apparent hereinafter are realized in a disk drive suspension 10 comprising a generally horizontally extending mount plate 12, a base portion 14, a hinge portion 16 and a beam portion 18, and a pair of laterally separated cooperating engagement structures 22, 24 comprising vertically separable members comprising continued extents 38, 42 on the mount plate and continuations 46, 48 on the beam portion, arranged in each pair to block their relative vertical movement in one direction (moving the pair members together) but not in the other (moving the pair members apart) to increase torsional stiffness of the suspension freely of an increase in vertical stiffness or decrease vertical stiffness freely of a decrease in torsional stiffness.

Mount plate cooperating engagement structures are on either lateral side 26, 28 of the hinge portion 16. Mount plate 12 extends in a plane P-P along the suspension longitudinal axis A-A. Mount plate 12 has a distal region 32 defining the mount plate cooperating engagement structure 22. Beam portion 18 has a proximate region 34 defining the beam portion cooperating engagement structure 24. Cooperating engagement structures 22, 24 include a pair of left and right hand, laterally narrow, continued extents 38, 42 of the mount plate distal region 32 each having a first face 38a, 42a and an oppositely facing second face 38b, 42b. Cooperating engagement structures 22, 24 further include a pair of left and right hand, laterally narrow, continuations 46, 48 of the beam portion proximate region 34 each having a first face 46a, 48a and an oppositely facing second face 46b, 48b. In the FIGS. 1-4 faces 46b and 48b engagingly oppose respectively first faces 38a, 42a, of the mount plate distal region continued extents 38, 42 to block movement of the continuations 46, 48 past the engaged faces but not away from the engaged faces.

Cooperating engagement structures 22, 24 are located on either lateral side 26, 28 of the hinge portion 16 and are vertically untrammeled on one face (38a or 38b, 42a or 42b, 46a or 46b, 48a or 48b) on each lateral side 26, 28 of the hinge portion 16 where the opposite face is engaged, enabling vertical movement of the continued extents 38, 42 or continuations 46, 48 in the other direction. As noted, typically, mount plate 12 extends in the plane P-P along the suspension longitudinal axis A-A; as shown in the Figures, typically, the mount plate having distal region 32 that defines the mount plate cooperating engagement structure 22 is in vertically offset relation to the plane P-P and vertically opposed to the beam portion cooperating engagement structure 24. Beam portion 18 can have edge rails 36 adjacent the beam portion cooperating engagement structure 24 for increasing the local stiffness adjacent the cooperating engagement structure.

The left and right hand laterally narrow continued extents 38, 42 of the mount plate distal region 32 extend into the vertical plane V-V that includes the hinge portion 16. Beam portion left and right hand narrow continuations 46, 48 of the beam portion proximate region 34 also extend into the vertical plane V-V of the hinge portion 16, thereby opposing the beam portion distal region continued extents 38, 42 on one face of each 38a, 42a only. Left and right continued extents 38, 42 and the left and right continuations 46, 48 are preferably maximally laterally spaced, e.g. a distance S, as shown, and are shaped to each have about the same lateral extent L.

Figure 2:
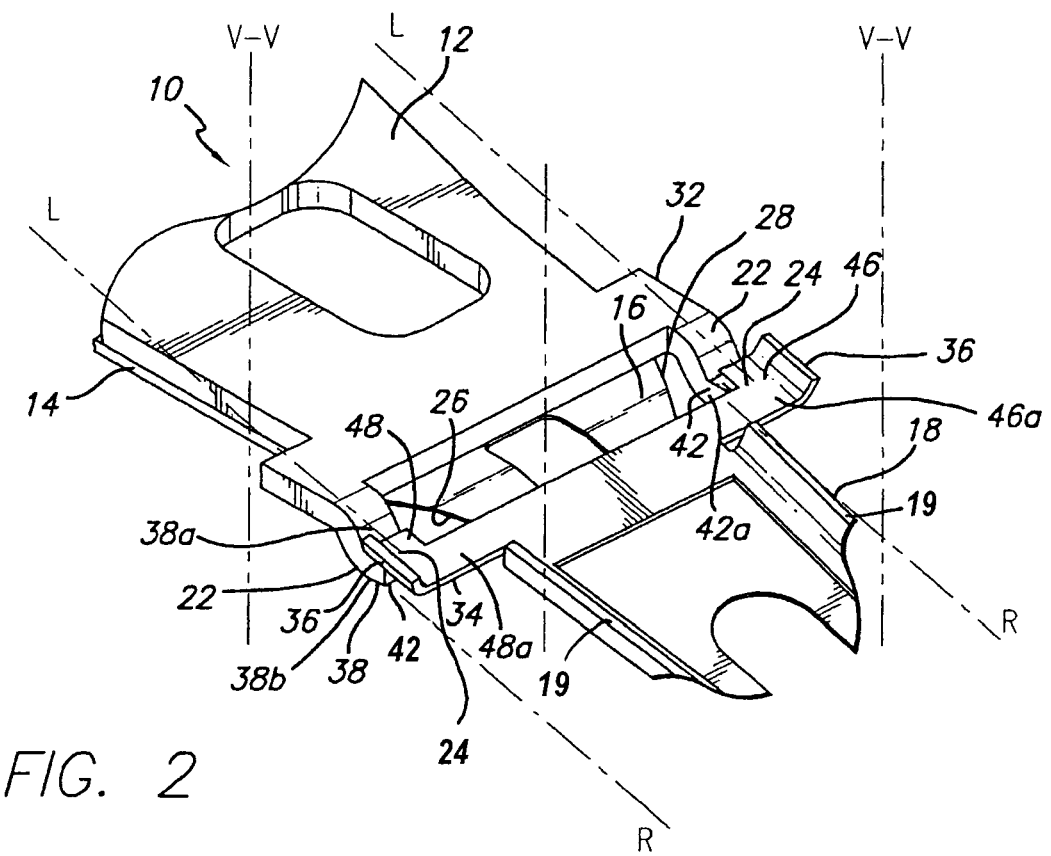
FIG. 2 is an oblique view of the top of the invented suspension spring area.
Figure 3:
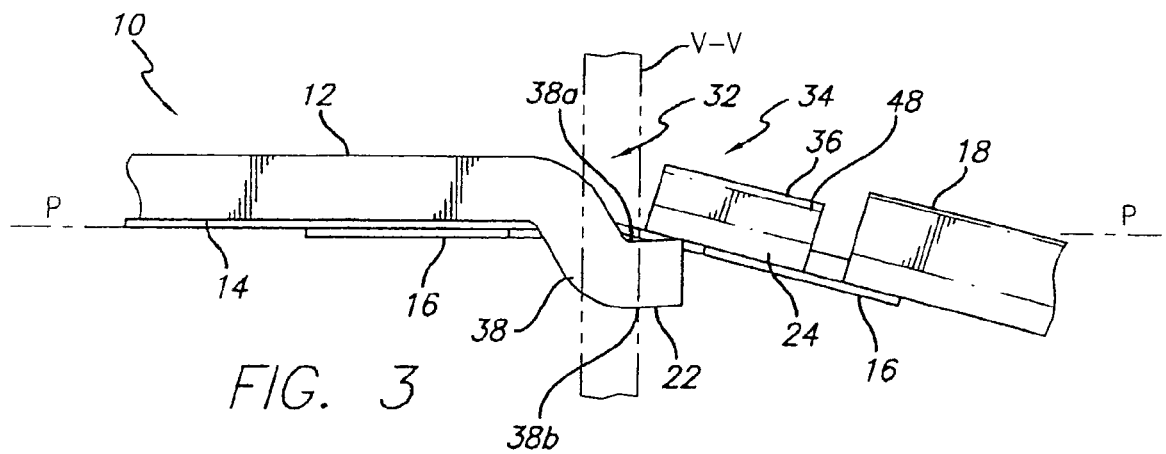
FIG. 3 is a side view of the invented suspension spring area.
Figure 4:
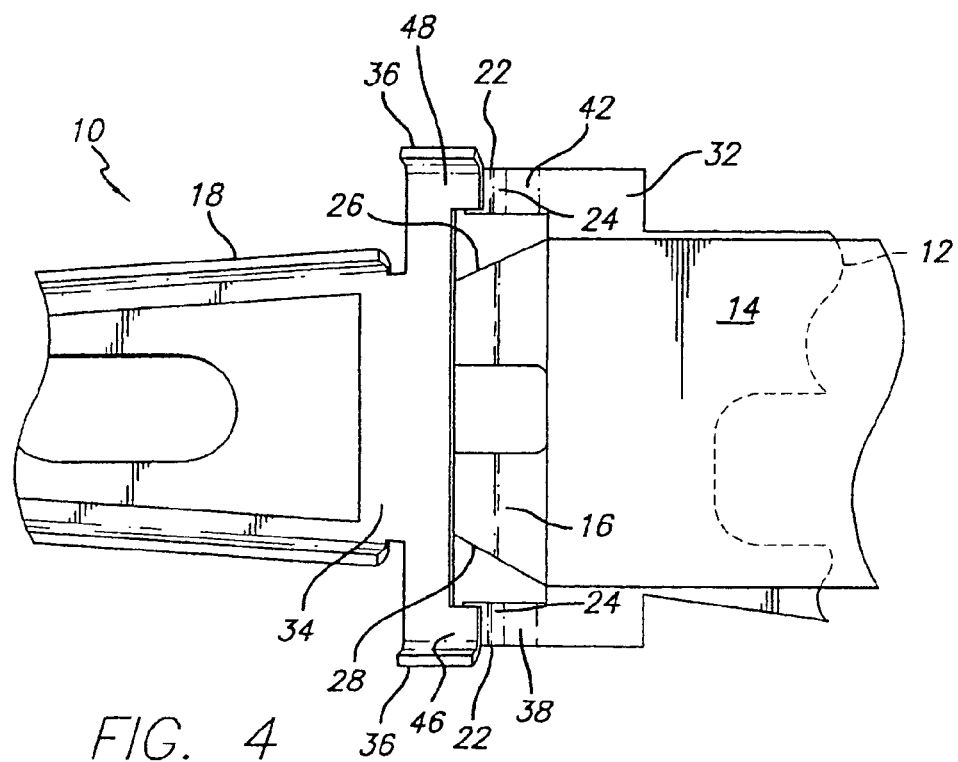
FIG. 4 is a top view of the invented suspension spring area.

As can be seen in FIGS. 2 and 4, in the illustrative embodiment the left and right hand cooperating engagement structures 22, 24 are laterally widely spaced apart. In the embodiment, cooperating engagement structures 22, 24 are laterally spaced apart by a distance of greater than half the width of beam portion 18, where the width of beam portion 18 is defined as the farthest distance between load beam stiffening edge rails 19 (FIG. 2). More particularly, in the embodiment cooperating engagement structures 22, 24 are laterally spaced by a distance of greater than the width of beam portion 18. As can be further seen in FIGS. 2 and 4, in the embodiment the cooperating engagement structures 22, 24 are located proximally of the proximate most extent of load beam stiffening edge rails 19, such that the cooperating engagement structures engage at loci that are proximal of beam portion stiffening edge rails 19.

The invention method of increasing or maintaining the torsional stiffness of a disk drive suspension 10 comprising a mount plate 12, a base portion 14, a hinge portion 16 and a beam portion 18 freely of an increase in vertical stiffness, including opposing laterally separated cooperating engagement structures 22, 24 on the mount plate and the beam portion, and blocking movement of these said structures past each other but not away from each other in response to rotational movement of said beam portion relative to said mount plate in suspension torsional stiffness increasing relation, and further engaging the structures at the axis of rotation R-R of the beam portion.

Figure 5:
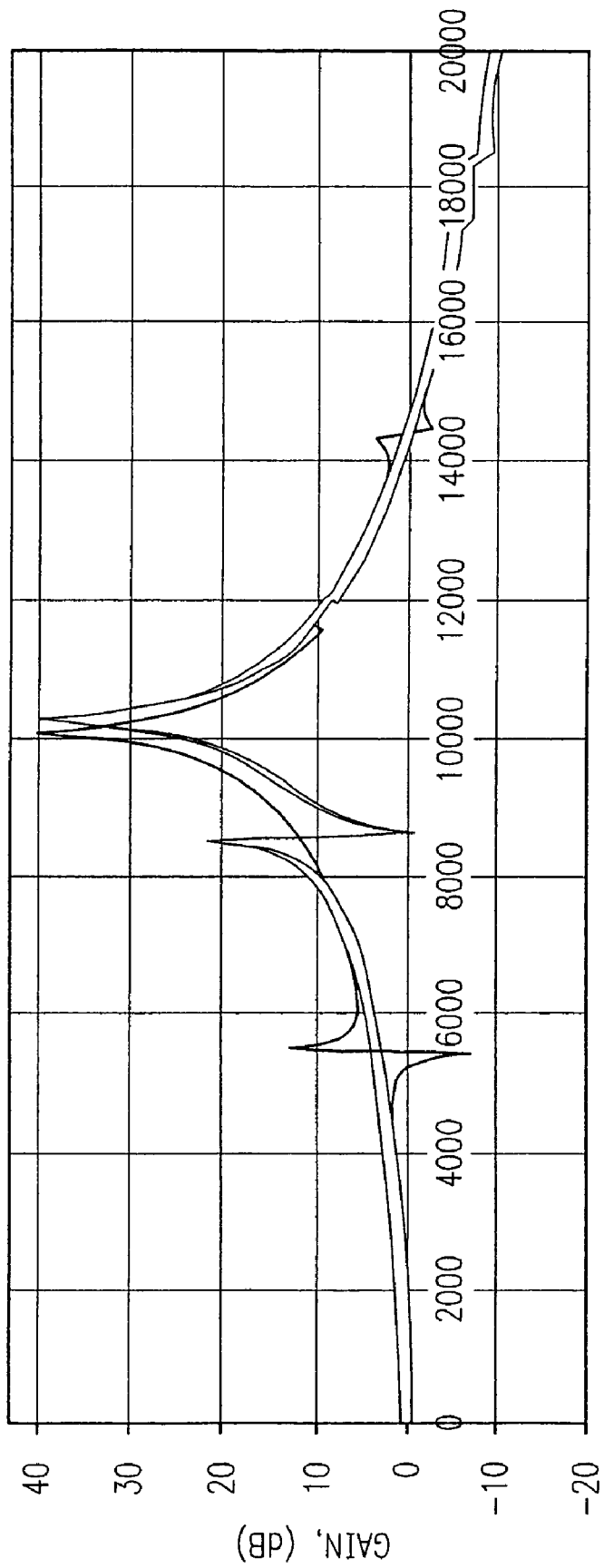
FIG. 5 is a modeled Bode plot of the resonance performance of the invented suspension, showing a first torsion resonance at about 8500 Hz.
Figure 6:
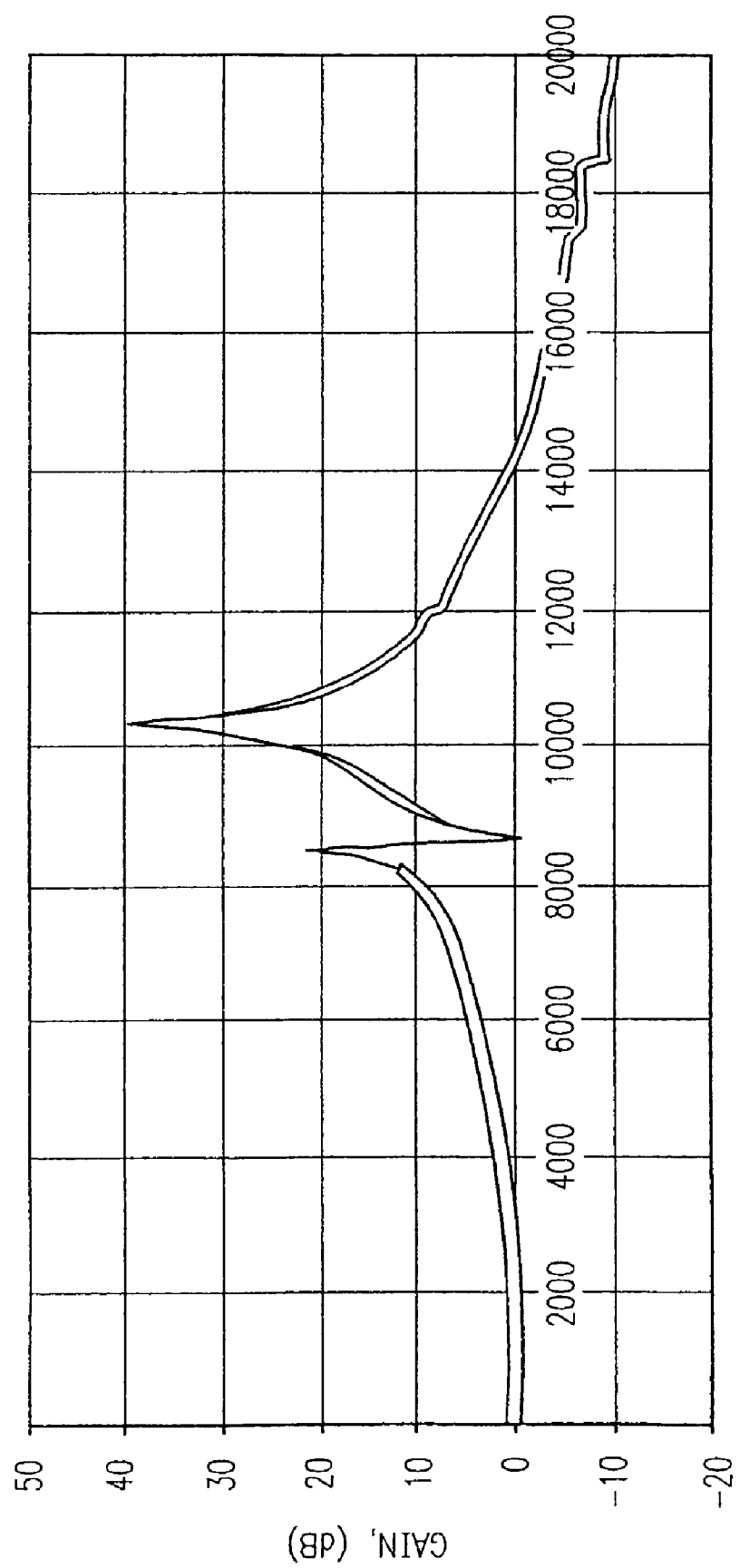
FIG. 6 (PRIOR ART) is a further modeled Bode of a conventional suspension with first torsion resonance at about 5500 Hz, having the same vertical stiffness as the invention suspension, illustrating that the invention yields an improvement in torsional frequency response without an increase in vertical stiffness.

Bode plots in FIGS. 5 and 6 (Prior Art) illustrate the improvements realized with the invention.

The invention thus provides an improved disk drive suspension having separated or uncoupled torsion stiffness and vertical stiffness properties from opposing cooperating structures carried by the mount plate and the beam portion selectively engaging to increase torsional stiffness and efficiently in construction and operation by allowing separation that does not affect performance, i.e. vertically away rather than one or both of the opposed structures bracketing the other against both vertical away and vertical toward movement.

The foregoing objects are thus met.

I claim:

1. A disk drive suspension comprising a generally horizontally extending mount plate, a base portion, a hinge portion and a beam portion, and a pair of cooperating engagement structures comprising vertically separable members on said mount plate and said beam portion respectively, said members being laterally spaced apart by a distance of greater than half a width of said beam portion and arranged in each said pair to block their relative vertical movement in one direction but not in the other to increase torsional stiffness of said suspension freely of an increase in vertical stiffness or decrease vertical stiffness freely of a decrease in torsional stiffness.

2. The disk drive suspension according to claim 1, in which said mount plate has a distal region thereof and said beam portion has a proximate region thereof, and said mount plate cooperating engagement structure comprises a pair of left and right hand continued extents of said mount plate distal region each having a first face and an oppositely facing second face, said beam portion cooperating engagement structure comprising left and right hand continuations of said beam portion proximate region engagingly opposing one of said first and second faces of said beam portion proximate region continued extents to block movement of said continuations past said engaged faces but not away from said engaged faces, the mount plate cooperating engagement structure and the beam portion cooperating engagement structure engaging at loci that are proximal of stiffening edge rails of said beam portion.

3. The disk drive suspension according to claim 1, in which said cooperating engagement structures are on either lateral side of said hinge portion and vertically untrammeled on one side for vertical movement in said other direction.

4. The disk drive suspension according to claim 1, in which said mount plate extends in a plane along the suspension longitudinal axis, said mount plate having a distal region defining said mount plate cooperating engagement structure in vertically offset relation to said plane.

5. The disk drive suspension according to claim 1, in which said beam portion has a proximate region defining said beam portion cooperating engagement structure, said beam portion cooperating engagement structure being located proximal of stiffening edge rails of said beam portion.

6. The disk drive suspension according to claim 5, in which said beam portion has edge rails adjacent said beam portion cooperating engagement structure.

7. The disk drive suspension according to claim 5, in which said mount plate extends in a plane along the suspension longitudinal axis, said mount plate having a distal region defining said mount plate cooperating engagement structure in vertically offset relation to said plane and vertically opposed to said beam portion cooperating engagement structure.

8. The disk drive suspension according to claim 7, in which said mount plate cooperating engagement structure comprises a pair of left and right hand continued extents of said mount plate distal region extending into a vertical plane including said hinge portion, said beam portion cooperating engagement structure comprising left and right hand continuations of said beam portion proximate region extending into said vertical plane and opposing said beam portion proximate region continued extents on one side thereof only.

9. The disk drive suspension according to claim 8, in which said left and right continued extents and said left and right continuations are laterally spaced by a distance that is greater than a width of said beam portion.

10. The disk drive suspension according to claim 9, in which said left and right continued extents and said left and right continuations each have about the same lateral extent.

11. The disk drive suspension according to claim 1, in which said members are laterally spaced apart by a distance that is greater than the width of said beam portion.

12. A disk drive suspension comprising a generally horizontal mount plate, a base portion attached to said mount plate, a hinge portion extended from said base portion, and a beam portion supported by said hinge portion, and a divided mount plate cooperating engagement structure comprising members defined by a pair of left and right hand laterally separated continued extents of said mount plate extending into a vertical plane including said hinge portion, said members being laterally spaced apart by a distance of greater than half a width of said beam portion, and a divided beam portion cooperating engagement structure comprising members defined by a pair of left and right hand laterally separated continuations of said beam portion extending into said vertical plane and opposing respective mount plate members on one side thereof, whereby rotation of said beam portion is limited by selective engagement of said left hand or said right hand continued extents and continuations, while said hinge portion is untrammeled by said engagement and said suspension has increased torsional stiffness without an increase in suspension vertical stiffness or has a decrease in suspension vertical stiffness without a decrease in torsional stiffness.

13. The disk drive suspension according to claim 12, in which said left and right continued extents and said left and right continuations are laterally spaced by a distance that is greater than the width of said beam portion.

14. The disk drive suspension according to claim 13, in which said left and right continued extents and said left and right continuations each have about the same lateral extent.

15. The disk drive suspension according to claim 12, in which said left and right continued extents and said left and right continuations each have about the same lateral extent.

16. The disk drive suspension according to claim 12, in which said cooperating engagement structures are on either lateral side of said hinge portion.

17. The disk drive suspension according to claim 12, in which said mount plate extends in a plane along the suspension longitudinal axis, said mount plate having a distal region defining said mount plate cooperating engagement structure in vertically offset relation to said plane.

18. The disk drive suspension according to claim 17, in which said beam portion has a proximate region defining said beam portion cooperating engagement structure.

19. The disk drive suspension according to claim 18, in which said beam portion has edge rails adjacent said beam portion cooperating engagement structure.

20. The disk drive suspension according to claim 18, in which said mount plate extends in a plane along the suspension longitudinal axis, said mount plate continued extents being in vertically offset relation to said plane and vertically opposed to said beam portion continuations.

21. The disk drive suspension according to claim 20, in which said hinge portion extends through a vertical plane between said mount plate and said beam portion, said continued extents and said continuations extending into said vertical plane in opposed relation.

22. The disk drive suspension according to claim 12, in which said left and right continued extents and said left and right continuations are laterally spaced by a distance of greater than half a width of said beam portion.

23. The disk drive suspension according to claim 22, in which said left and right continued extents and said left and right continuations each has about the same lateral extent.

* * * * *